(12) United States Patent
Kojima

(10) Patent No.: US 6,966,401 B2
(45) Date of Patent: Nov. 22, 2005

(54) SOUND ABSORBING DEVICE FOR FUEL TANK

(75) Inventor: Takeshi Kojima, Machida (JP)

(73) Assignee: Nifco Inc., Yokohama (JP)

( * ) Notice: Subject to any disclaimer, the term of this patent is extended or adjusted under 35 U.S.C. 154(b) by 94 days.

(21) Appl. No.: 10/461,441

(22) Filed: Jun. 16, 2003

(65) Prior Publication Data

US 2004/0060770 A1    Apr. 1, 2004

(30) Foreign Application Priority Data

Oct. 1, 2002    (JP) ............................. 2002-288981

(51) Int. Cl.⁷ ........................ F16L 55/02; F16L 55/033; F16L 55/035; B65D 90/52
(52) U.S. Cl. .................. 181/233; 220/567.2; 220/734; 137/582
(58) Field of Search ................................ 181/233, 234, 181/258; 220/567.2, 563, 734, 88.2, 86.2, 220/86.3; 137/582; 251/120, 127

(56) References Cited

U.S. PATENT DOCUMENTS

| | | | | |
|---|---|---|---|---|
| 3,294,278 A | * | 12/1966 | Madden et al. | 220/563 |
| 3,400,854 A | * | 9/1968 | Conaway et al. | 220/734 |
| 3,784,050 A | * | 1/1974 | Pollack | 220/734 |
| 4,299,305 A | * | 11/1981 | Eriksson | 181/230 |
| 4,764,408 A | * | 8/1988 | Stedman et al. | 220/88.1 |
| 4,974,743 A | * | 12/1990 | Sasaki et al. | 220/88.1 |
| 5,031,795 A | * | 7/1991 | Kotera et al. | 220/563 |
| 5,398,840 A | * | 3/1995 | Luhman et al. | 220/563 |
| 5,777,947 A | * | 7/1998 | Ahuja | 181/256 |
| 6,032,347 A | | 3/2000 | Behr et al. | |
| 6,062,417 A | * | 5/2000 | Evans | 220/563 |
| 6,408,979 B1 | * | 6/2002 | Forbes et al. | 220/563 |
| 6,415,942 B1 | * | 7/2002 | Fenton et al. | 220/563 |
| 2003/0015537 A1 | * | 1/2003 | Konja | 220/563 |

FOREIGN PATENT DOCUMENTS

| | | | | |
|---|---|---|---|---|
| EP | 0 976 599 | | 2/2000 | |
| GB | 2031062 A | * | 4/1980 | F01N 1/24 |
| JP | 04352691 A | * | 12/1992 | B65D 90/52 |
| JP | 5-139169 | | 6/1993 | |
| JP | 6-6986 | | 2/1994 | |
| JP | 6-28430 | | 8/1994 | |
| JP | 6-28431 | | 8/1994 | |
| JP | 2719002 | | 11/1997 | |

* cited by examiner

Primary Examiner—Edgardo San Martin
(74) Attorney, Agent, or Firm—Manabu Kanesaka

(57) ABSTRACT

A sound absorbing device is attached to an inside of a fuel tank for alleviating and absorbing sound of liquid accompanied by fuel movement inside the fuel tank. The sound absorbing device includes a screen member formed in a flat bag shape, and small pieces stored inside the screen member.

12 Claims, 6 Drawing Sheets

SOUND ABSORBING DEVICE FOR FUEL TANK

BACKGROUND OF THE INVENTION AND RELATED ART STATEMENT

The present invention relates to a sound absorbing or noise reduction device for a fuel tank attached inside the fuel tank to alleviate and absorb the sound of liquid accompanied by waving of fuel and so on.

This kind of sound absorbing device, for example, is shown in FIG. 7(a) disclosed in Japanese Utility Model Publication (KOKOKU) No. 6-6986 (FIGS. 1–6), or in FIG. 7(b) disclosed in Japanese Patent No. 2719002 (FIGS. 1–12). In the noise reduction structure in FIG. 7(a), multiple plane meshes or screens 51 are used and rib-shaped protrusions 51a are laid between the screens 51 and stacked in layers at regular intervals. The mesh member 50 in the form of layer is disposed along the inner wall of a fuel tank 40 (a tank in FIG. 7(a) is a horizontal cross section), and attached through a bracket etc. not shown in the figure. Tn the operating, when the liquid or fuel of the tank 40 is moved by vibration, the fluctuation passes the mesh or screen of the mesh member 50, and is dispersed, or alleviated and absorbed in the process of passing through the screens 51, so that the kinetic energy of the fluctuation is attenuated to prevent the sound of liquid.

On the other hand, in the noise reduction structure in FIG. 7(b), a spongy baffle portion 56 is firmly fixed to a part of a bracket 55 attached inside the fuel tank 40. In the baffle portion 56, a molten resin material is slenderly extruded to the corresponding part of the bracket 55 from many exclusive nozzles as a resin rod 57; is intertwined or entangled as a cotton-waste-shape as shown on the right side of FIG. 7(b); and stacked at a predetermined size. Numeral 58 is a hook for fitting a holding plate 59 to the fixed bracket 55 on the tank side. In this operation, when the liquid fuel of the tank 40 is undulated or moved by vibration, the fluctuation is dispersed or alleviated and absorbed in the process of passing many small spaces or maze-like intervals of the baffle portion 56.

The above-mentioned conventional structure is yet unsatisfactory in terms of the following point. Namely, in the structure of Japanese Publication 6-6986, the mesh member 50 is flat and stacked in layers, and has to be attached to many places, i.e. up-and-down and right-and left portions, along the inner wall of the tank, so that the steps for attaching to the fuel tank 40 are increased. Also, if the fuel tank 40 is divided into up and down sections as shown in FIG. 7(b), the noise reduction effect may be restricted because the mesh member 50 cannot be attached to one of the up-and-down tank half members 41, 42.

In the structure of Japanese Patent No. 2719002, an expensive and exclusive equipment for forming the spongy baffle portion 56 is required. Since the baffle portion 56 is welded to the bracket 55 as the resin material is pushed out of the exclusive nozzle, the molding operation becomes complicated in order to form the stably and firmly fixed state. Since the baffle portion 56 has to be produced according to the type (size and shape) of the fuel tank 40, it lacks versatility.

The present invention has been made in order to solve the above problems and to provide a sound absorbing device for a fuel tank to be able to be mass-produced regardless of the type of the fuel tank at a lower cost.

Another object of the present invention is to provide a versatile sound absorbing device for a fuel tank having excellent quality for assembly in addition to the noise reduction.

Further objects and advantages of the invention will be apparent from the following description of the invention.

SUMMARY OF INVENTION

In order to achieve the above-mentioned purposes, the present invention provides a sound absorbing device for a fuel tank including an attaching portion and a sound-absorbing portion attached to the inner wall of the fuel tank through the attaching portions, which alleviates and absorbs the sound of liquid accompanied by fuel movement inside the fuel tank by the sound-absorbing portion. The sound-absorbing portion is composed of a mesh or screen member formed in a flat bag shape, and many small pieces stored inside the flat bag of the mesh member.

In the above-mentioned structure, the mesh member is formed as a screen or a net. Resin, fiber fabric, or mesh material for knitting on the market can be used for the mesh member. Optimally, flexible mesh material should be used. The small pieces should have a size which does not protrude from the mesh of the mesh member and which can alleviate and absorb the wave motion of the fuel liquid. As a standard, optimally, the full size should be approximately 10 mm–40 mm.

A special feature of the present invention is that the wave motion can be efficiently alleviated and absorbed by the synergistic effect of alleviating and absorbing operation by meshes or screens of both flat sides (front and back faces) widened in plane, and alleviating and absorbing operation by spaces held by the small pieces inside the flat bags and stored many small pieces. Also, since the present invention is formed as a unit, for example relative to Japanese Publication No. 6-6986, it is hard to be restricted to the installation inside the tank, so it can improve the attachment ability. It can be used as multipurpose molding equipments for Japanese Patent No. 2709002, and the manufacturing process can also be simplified.

Optimally, the present invention may be formed in the following manner. In the second aspect, at least one part of the side edge of the flat bag is supported by the resin frame member. This frame member has a frame function for holding the flat pouched mesh member in the predetermined shape, an attachment function into the fuel tank explained below, and a function for selecting a partial oscillating degree of the mesh member inside the fuel tank.

In the third aspect, the attaching portions are provided integrally on the frame member. Since the frame member operates as the attaching portion, the structure can be simplified.

In the fourth aspect, the frame member includes frame parts folded into two through a thin-walled portion, and one part of the side edge of the mesh member is supported between the frame parts. When the frame member is formed of two-folded half frame members, the number of parts can be reduced, and the fitting quality for the mesh member formed in the flat bag can be improved.

In the fifth aspect, one part of the side edge of the mesh member is joined and integrated with the frame member corresponding part. By forming the frame member and the mesh member partially at the same time, manufacturing steps can be reduced. To give an actual example, the material of the mesh member is set in a frame member forming pattern, and the corresponding part of the mesh member side edge is joined and integrated with the corresponding part of the frame member formed in the pattern. Also, the mesh member in a flat pouched shape with the small pieces stored therein is set in the forming pattern of the frame member, and joined and integrated with the frame member.

In the sixth aspect 6, optimally, the small pieces should be made of waste materials such as spools or liners, etc. made in the resin molding process, or recycled items using these waste materials. For small pieces of the invention, using resin waste materials can promote effective use of resources, and reduce the manufacturing costs. In this case, if the waste materials are thermoplastic, it is preferable to melt the waste materials and to form the shapes that can easily alleviate and absorb the waving motions.

DETAILED DESCRIPTION OF PREFERRED EMBODIMENTS

Figure 1A:
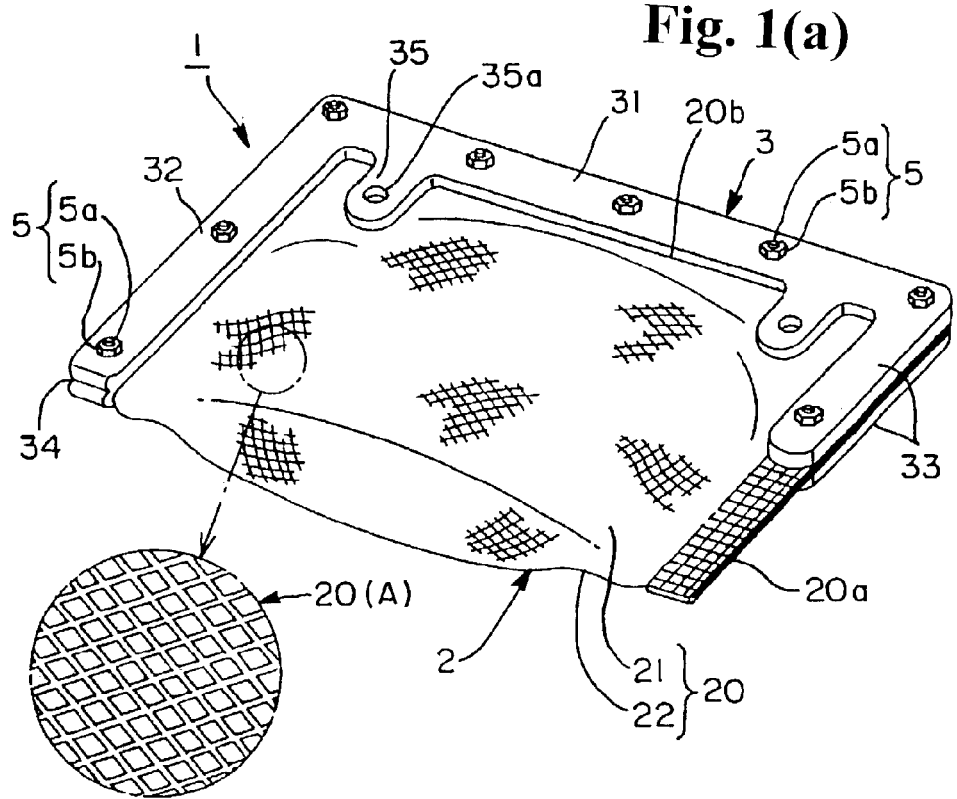
FIGS. 1(a)–1(b) are schematic outline views showing a sound absorbing device of the first embodiment of the present invention.
Figure 1B:
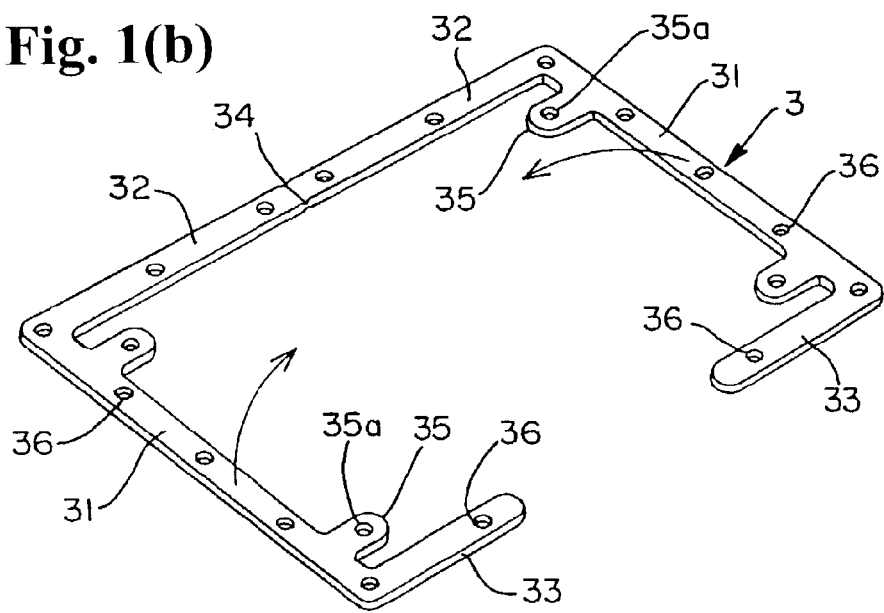
Figure 2:
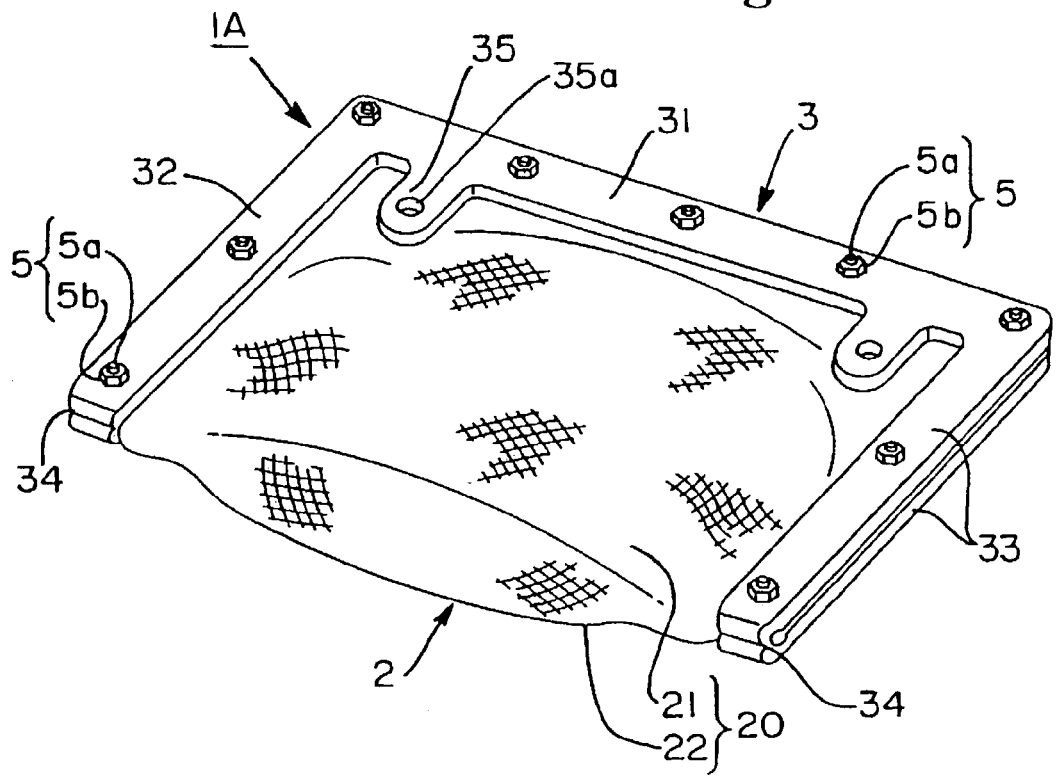
FIG. 2 is a schematic outline view showing a modified example of the first embodiment.
Figure 3A:
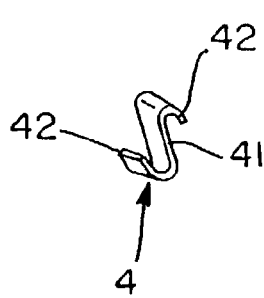
FIGS. 3(a)–3(c) are views showing shapes of small pieces forming the sound absorbing device.
Figure 3B:
Figure 3C:
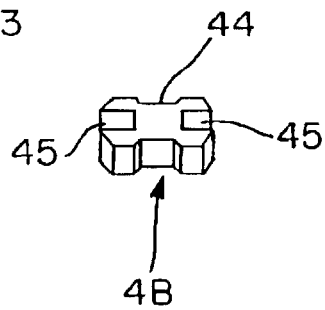
Figure 4A:
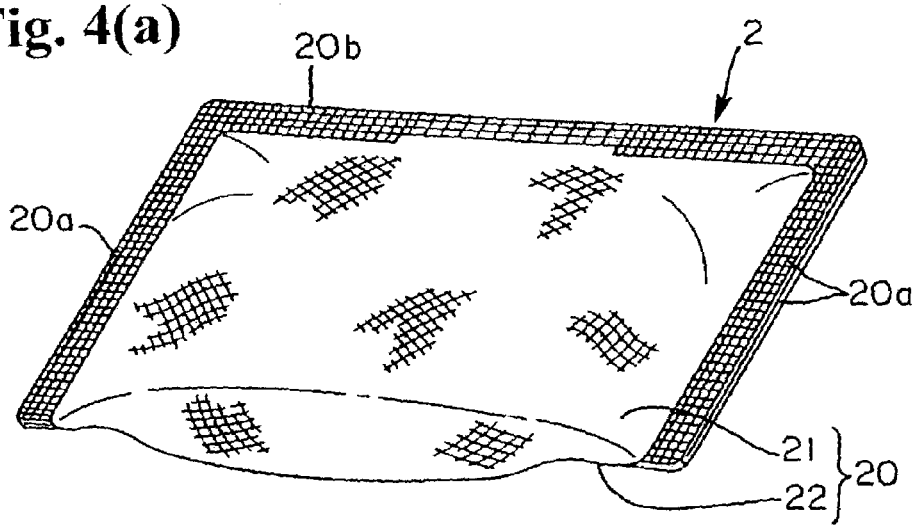
FIGS. 4(a)–4(c) are views showing embodiments of flat pouched mesh members which are the main parts of the present invention.
Figure 4B:
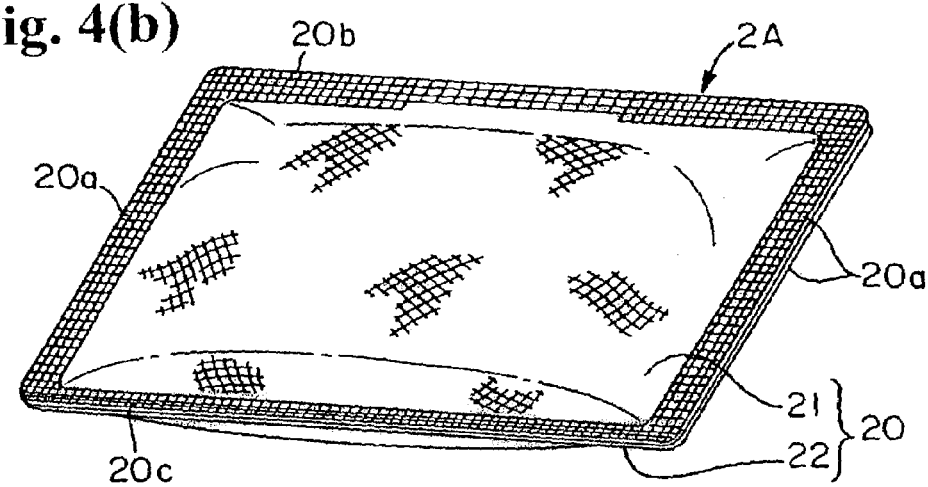
Figure 4C:
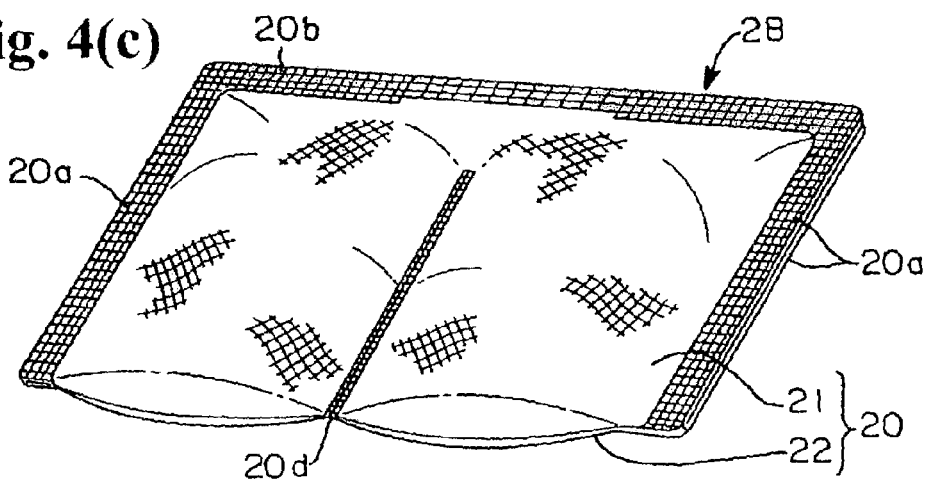
Figure 5A:
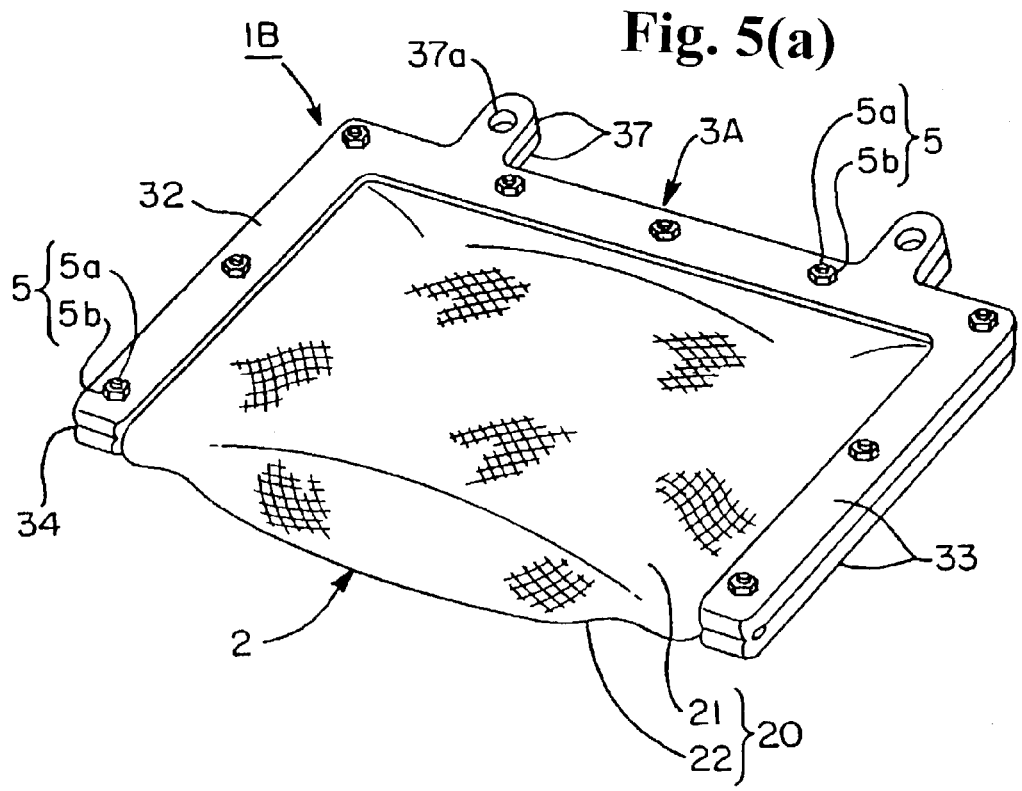
FIGS. 5(a)–5(b) are schematic outline views showing the sound absorbing device for the second embodiment of the present invention.
Figure 5B:
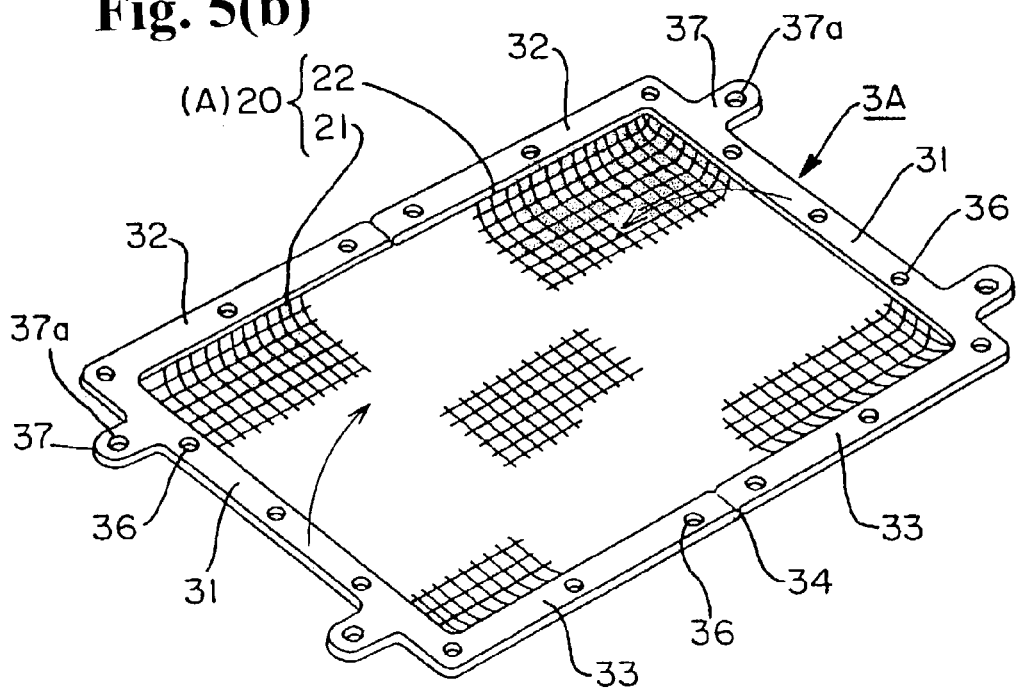
Figure 6A:
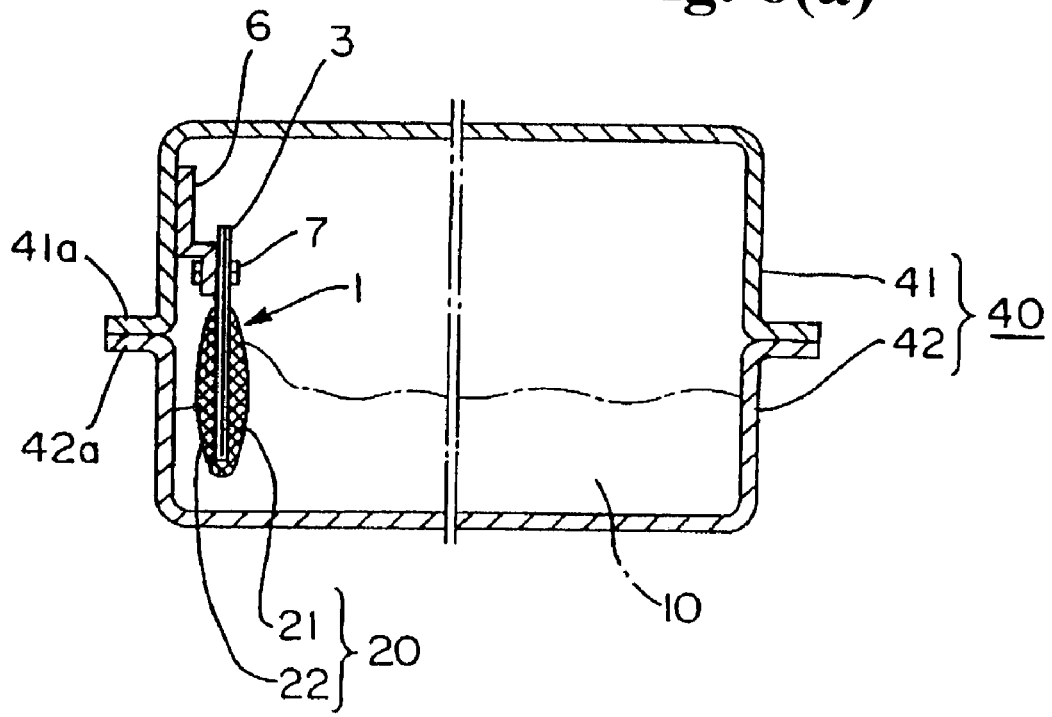
FIGS. 6(a)–6(b) are explanatory drawings showing attaching patterns of the sound absorbing device into the tank.
Figure 6B:
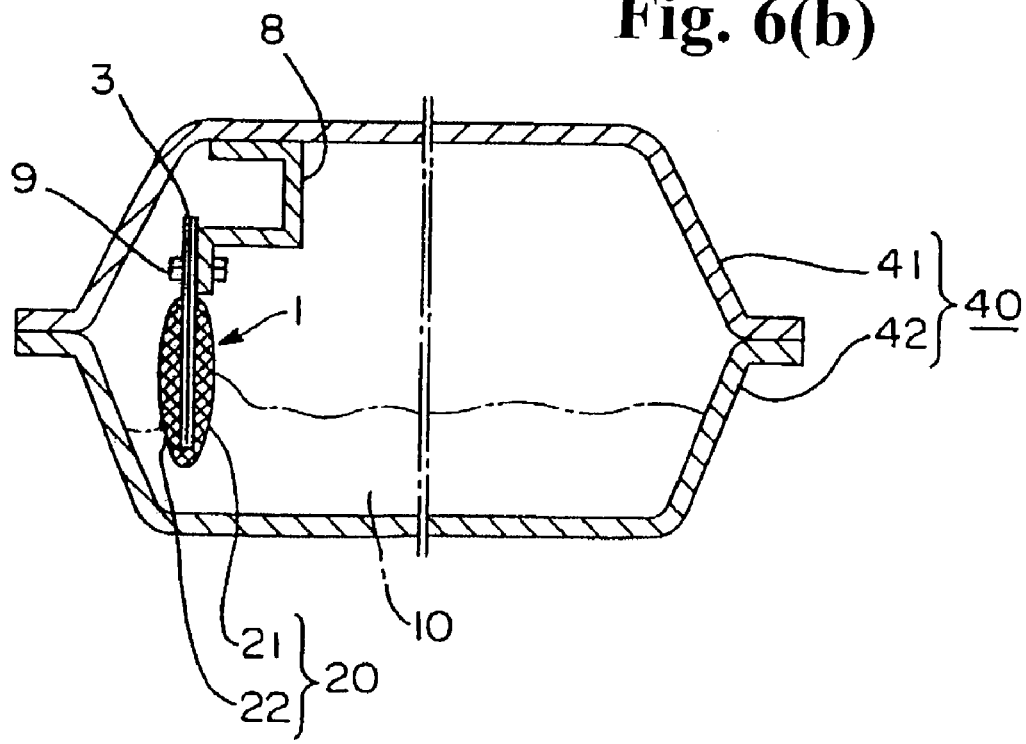
Figure 7A:
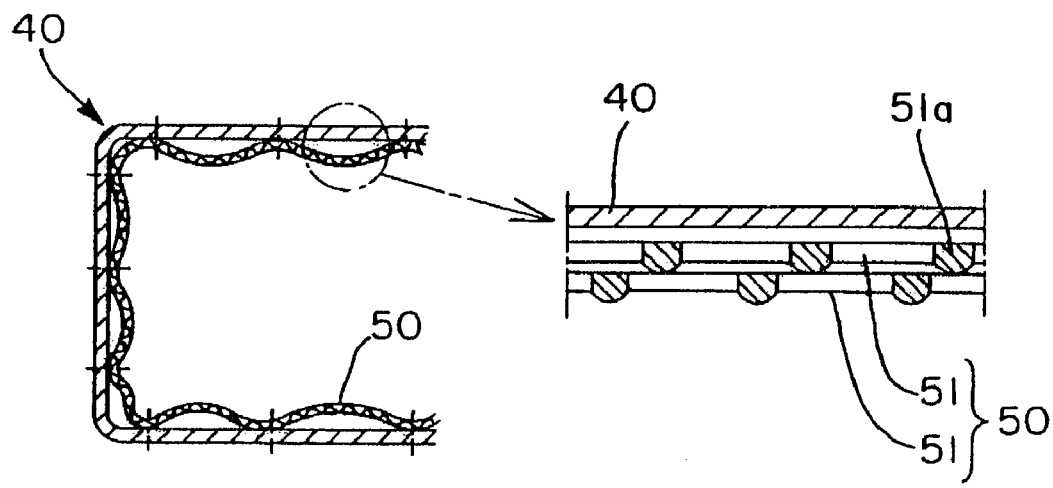
FIGS. 7(a)–7(b) are explanatory drawings showing two embodiments of conventional sound absorbing devices.
Figure 7B:
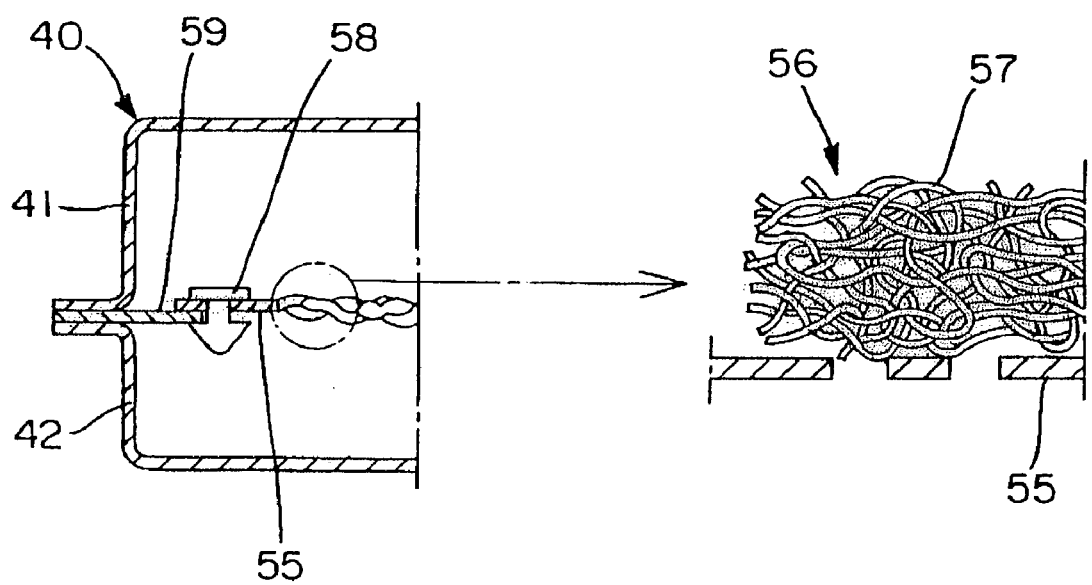

Detailed description of the embodiments of the present invention is made with reference to the drawings. FIGS. 1(a)–1(b) are the first embodiment, wherein FIG. 1(a) is a schematic outline view of the sound absorbing device, and FIG. 1(b) shows a frame member as a single article. FIG. 2 is a schematic outline view of the sound absorbing device showing a modified embodiment of the first embodiment. FIGS. 3(a)–3(c) are schematic views showing three embodiments of small pieces. FIGS. 4(a)–4(c) are structural views showing three embodiments when the mesh member is formed in a flat bag. FIGS. 5(a)–5(b) are the third embodiment, wherein FIG. 5(a) is a schematic outline view of the sound absorbing device, and FIG. 5(b) is a view showing the relationship between the frame member and the mesh member. FIGS. 6(a)–6(b) are two embodiments showing the attaching structure of the sound absorbing device into the tank. In the following explanation, the sound absorbing device structure, attaching structure, and operation of each embodiment are explained in order.

In the first embodiment, the sound absorbing device 1 in FIG. 1(a) is composed of a mesh member 20 whose sound-absorbing portion 2 is formed in a flat bag, and which stores many small pieces 4; and a frame member 3 whose attaching portions support side edges 20a of both sides and a side edge 20b of the upper side among the side edges of the mesh member 20.

Here, the mesh member 20 is formed in a short and flat bag using materials forming mesh or screen shown in the enlarged view in FIG. 1(a). The material is synthetic fiber, but it can be other materials. In order to manufacture in a flat bag shape from a cloth of the mesh material A, there may be formed by: as the mesh member 2 as shown in FIG. 4(a), cutting the material to a larger size of the extended bag shape, folding the material in the middle, welding both side edges 20a and both side edges 20b of the upper side; or as the mesh member 2A shown in FIG. 4(b), cutting the material corresponding both faces of the bag, i.e. front and rear faces 21, 22, overlapping the front and back faces 21, 22, and welding both side edges 20a, both side edges 20b of the upper side, and both side edges 20c of the lower side. Also, in the mesh members 2, 2A, for example, one part of both side edges 20b of the upper side is left as non-welding portions, and through which a predetermined number of small pieces 4 is stored.

On the other hand, in the mesh member 2B shown in FIG. 4(c), the mesh member 2 in FIG. 4(a) is joined in the up-and-down direction at the middle part on the right and left, and dividing the bag into multiple numbers (in this embodiment, divided into two) by the joint portion 20d. This kind of divided structure can prevent the stored small pieces from leaning and accumulating on one part of the flat bag. In dividing the bag, the bag may be divided up and down in addition to right and left.

Each small piece 4 used in the embodiment is bent on both sides of a linear portion 41 in different directions as shown in FIG. 3(a), and has a whole size of 15 mm–30 mm. When these multiple pieces are put into the bag of the mesh member 20, each small piece is designed to be able to overlap while keeping a gap with each other all the time. The shape of the small piece may have a tetra pod shape in which projections 43 project in four directions as the small piece 4A shown in FIG. 3(b); a chip shape forming groove portions 44, 45 on the respective opposite faces of the small slope portions as the small piece 4B shown in FIG. 3(c); and other shapes.

Also, the small pieces 4, 4A, 4B are made of resin, but other materials can be used. In the case of resin, from the aspect of effective use of resources or cost reduction, it is preferable to use waste materials such as spool or liner, etc. formed in a resin molding process. Also, if the waste material is thermoplastic, it is preferable to melt the waste material and mold it in the shape of the small piece 4, 4A, 4B, or a similar shape.

The frame member 3 is formed integrally in a state where both half frame members of the same shape are connected by a thin-walled portion 34 at one side as shown in FIG. 1(b). Each half frame member has a roughly U shape with a size according to the mesh member 2, and is composed of an intermediate portion 31 corresponding to the upper side edge 20b, and both ends or side portions 32, 33 corresponding to both side edges 20a. In this embodiment, the end sides 32 are formed longer than the other end sides 33, and the end sides 32 where both half frame members are elongated are connected through the thin-walled portion 34.

Also, in the intermediate portion 31 of each half frame member, a plurality of (in this embodiment, two pieces) attaching portions 35 is provided with a space adjacent to each other. Each attaching portion 35 includes an attaching hole 35a, and is projected to an inside from each intermediate portion 31. On the intermediate portions 31 and both ends 32, 33, multiple connecting holes 36 are formed to pass through. The attaching holes 35a and connecting holes 36 on each half frame member are overlapped on the corresponding attaching holes 35a and connecting holes 36 when both half frame members are folded at the thin-walled portion 34.

In the frame member 3, for example, in the state of FIG. 1(b), the mesh member 20 storing the small pieces 4 is disposed on one side of the half frame member, another half frame member is folded at the thin-walled portion 34, and the upper side edge 20b of the mesh member 20 and both side edges 20a are held between both half frame members. The frame member 3 and mesh member 20 are attached as a finished product by connecting both half frame members through connecting tools 5.

For the connecting tools 5, bolts 5a and nuts 5b are used. The bolt 5a passes through a connecting hole 36 on one side of the half frame member; mesh or enlarged portion at the corresponding edge of the mesh member 2 (through-holes can be provided according to need); and a connecting hole 36 of another half frame member. The nut 5b is used for tightening. However, the connecting tools 5 are not limited to the above, and for example, press fitting or a clip can be used for connecting.

In the modified embodiment as shown in FIG. 2, the shape of the frame member 3 is changed. Namely, in the frame member 3, both half frame members are shaped in the same shape, and folded into two at the thin-walled portions 34 at both sides. In the sound absorbing device 1A, since the frame member 3 surrounds the corresponding parts of the mesh member 20 with both ends 32, 33 of right and left and intermediate portions 31, oscillation or movement of the mesh member 20 is controlled at the part where the end 33 is extended when the wave motion of the fuel liquid is received inside the fuel tank 40, as compared to the sound absorbing device 1 in FIGS. 1(a)–1(b).

In the sound absorbing device 1B in FIGS. 5(a)–5(b) as the second embodiment, the joint connection between the mesh member 20 and the frame member 3A, and the positions of the attaching portions 37 are changed relative to the configurations of FIGS. 1 and 2. Since other parts of the embodiment are the same, only changed parts are described.

In the frame member 3A, as shown in FIG. 5(b), both half frame members have the same roughly U shapes composed of intermediate portions 31 and both ends 32, 33, and are folded into two at the thin-walled portions 34. Also, each attaching portion 37 is projected to the outside of the frame from each intermediate portion 31. Each attaching portion 37 corresponds to each attaching portion 35, and includes an attaching hole 37a. In this structure, the frame member 3A is joined and integrated with the peripheral part of the mesh member 20.

In other words, in the embodiment, mesh material A whose size corresponds to the front and back faces 21, 22 of the mesh member 20 is placed inside the mold of the frame member, and the corresponding edge of the mesh material A is molded into the thick-walled portion of the frame member 3A, so that the mesh member 20 and the frame member 3A are joined and integrated.

Therefore, in the assembling operation, both half frame members are folded into two at the thin-walled portion 34 from the condition of FIG. 5(b). At this time, after small pieces 4 with a fixed number are stored inside, both half frame members are connected by the multiple connecting tools 5 as described above. Thus, in the second embodiment, as shown in FIG. 4(a), the operation for making the mesh member 20 in a flat form by welding, etc. can be omitted.

In the structure of attaching the device into the tank, FIGS. 6(a)–6(b) show conditions where the above-mentioned sound absorbing device is attached to the fuel tank. The fuel tank 40 is integrated in a state where an upper half tank member (upper shell) 41 and a lower half tank member (lower shell) 42 are joined to each other at flanges 41a, 42a by welding, etc. In the upper half tank member 41, the sound absorbing device 1 (1A, 1B) is attached to the predetermined position through a bracket 6 or 8, before joining to the lower half tank member 42.

In the condition of FIG. 6(a), the bracket 6 is fixed to the inner face of the side wall by welding, and in the condition of FIG. 6(b), the bracket 8 is fixed to the inner face of the upper wall by welding. In the sound absorbing device 1 (1A, 1B), the attaching portions 35 (37) of the frame member 3 (3A) are overlapped on the corresponding parts of the bracket 6 or 8, and fixed in a suspended state by hooks or stoppers 7, 9 (for example, the bolt and the nut), etc. The location can be accordingly changed by capacity or shape of the fuel tank 40.

The above-mentioned sound absorbing device has the following operation and advantage. For a sound-absorbing structure, kinetic energy of fluctuation of the fuel fluid 10 can be efficiently reduced by the synergistic effect of meshes or screens with alleviating and absorbing operations which stop the wave motion through the meshes of flat pouched front and back faces 21, 22 widened in shape, and small pieces with alleviating and absorbing operations which keep a predetermined space by the small pieces 4 inside the flat bags of the mesh member 20, and stop wave motion entered in the space through the many small pieces 4. Thus, the sound of the liquid inside the fuel tank 40 can be prevented.

In this case, if the mesh member 20 held by the frame member 3 (3A) has a non-holding part through the short end 33, as shown in FIG. 1(a), and is allowed at the non-holding part to displace and oscillate, for example, when the fuel liquid 10 tries to move on a large scale, the motion of the fuel liquid 10 can be alleviated and absorbed by even the oscillating displacement of the non-holding part of the mesh member 20. As the structure, an expensive and exclusive molding machine such as disclosed in Japanese Patent No. 2709002 is not required. Since expansion can be easily made as shown in FIGS. 5(a)–5(b), manufacturing is easy as well. Also, according to the fuel tank to be installed, only frame member 3 (3A) can be changed, and the mesh member, or the sound-absorbing portion 2 can be shared. In addition, the present invention is not limited to the above embodiment, but it can be changed as required.

The sound absorbing device for the fuel tank with respect to the present invention stores many small pieces in the flat pouched mesh member, and can efficiently alleviate and absorb the liquid fuel wave motion by the synergistic effect of alleviating and absorbing operations by screens or meshes of both flat pouched sides, and alleviating and absorbing operations by space and many small pieces inside the flat bag. As a result, the kinetic energy of the fluctuation is attenuated to prevent the occurrence of the sound of liquid or fuel.

Also, the present invention can be attached easily inside the fuel tank and easily manufactured as compared to Japanese Publication No. 6-6986. Furthermore, it can be easily handled as a unit product as compared to Japanese Patent No. 2709002. In addition, by supporting one part of the side edges of the mesh member by the frame member, for example, the oscillating degree of the mesh member can be changed, so that the fluctuation of alleviating and absorbing capacities can be improved, or only the frame member can be changed according to the type of the fuel tank, so that the sound-absorbing portion can be shared.

While the invention has been explained with reference to the specific embodiments of the invention, the explanation is illustrative and the invention is limited only by the appended claims.

What is claimed is:

1. A sound absorbing device to be attached to an inside of a fuel tank for alleviating and absorbing sound of liquid accompanied by fuel movement inside the fuel tank, comprising:
   a screen member formed in a flat bag shape,
   a plurality of wave-motion-alleviating pieces stored inside the screen member adapted to alleviate the liquid fuel movement within the fuel tank, and
   a frame member for supporting at least one part of the screen member in the flat bag shape, said frame member including two frame parts having a thin-walled portion to be folded into two, said frame parts holding a part of side edges of the screen member therebetween.

2. A sound absorbing device according to claim 1, further comprising an attaching portion for attaching the screen member with the plurality of wave-motion-alleviating pieces to the fuel tank, said attaching portion being integrally formed with the frame member.

3. A sound absorbing device according to claim 1, wherein said frame member is integrally joined with a part of side edges of the screen member.

4. A sound absorbing device according to claim 1, wherein said plurality of wave-motion-alleviating pieces have projections adapted to maintain the plurality of wave-motion-alleviating pieces in a spaced apart relationship within the screen member.

5. A sound absorbing device to be attached to an inside of a fuel tank for alleviating and absorbing sound of liquid accompanied by fuel movement inside the fuel tank, comprising:
   a screen member formed in a flat bag shape,
   a plurality of wave-motion-alleviating pieces stored inside the screen member adapted to alleviate the liquid fuel movement within the fuel tank, and
   a frame member for supporting at least one part of the screen member in the flat bag shape, wherein the frame member further comprises an integral attaching portion adapted to be fixed to a bracket in the fuel tank for attaching the sound absorbing device to the fuel tank.

6. A sound absorbing device to be attached to an inside of a fuel tank for alleviating and absorbing sound of liquid accompanied by fuel movement inside the fuel tank, comprising:
   a screen member in a flat bag shape having a plurality of edges,
   a plurality of wave-motion-alleviating pieces stored inside the screen member adapted to alleviate the liquid fuel movement within the fuel tank, and
   a frame member holding at least two edges of the screen member thereby defining at least one unsupported edge of the screen member.

7. A sound absorbing device according to claim 1, wherein the plurality of wave-motion-alleviating pieces is positioned in an overlapping, spaced-apart relationship within the screen member.

8. A sound absorbing device to be attached to an inside of a fuel tank for alleviating and absorbing sound of liquid accompanied by fuel movement inside the fuel tank, comprising:
   a screen member formed in a flat bag shape;
   a plurality of wave-motion-alleviating pieces stored inside the screen member adapted to alleviate the liquid fuel movement within the fuel tank; and
   a frame member for supporting at least one part of the screen member in the flat bag shape, wherein the frame member includes two frame parts having a thin-walled portion to be folded into two, the frame parts holding a part of side edges of the screen member therebetween, said frame member including an intermediate portion and two side portions facing each other for holding an upper edge and two side edges of the screen member.

9. A sound absorbing device according to claim 8, wherein one of the two side portions has a length shorter than that of the other to allow the screen member to move freely.

10. A sound absorbing device according to claim 8, wherein the frame member further comprises an integral attaching portion adapted to be fixed to a bracket in the fuel tank.

11. A sound absorbing device according to claim 8, wherein said frame member is integrally joined with a part of side edges of the screen member.

12. A sound absorbing device according to claim 8, wherein said plurality of wave-motion-alleviating pieces have projections adapted to maintain the plurality of wave-motion-alleviating pieces in a spaced apart relationship within the screen member.

* * * * *